United States Patent Office 3,314,030
Patented Apr. 11, 1967

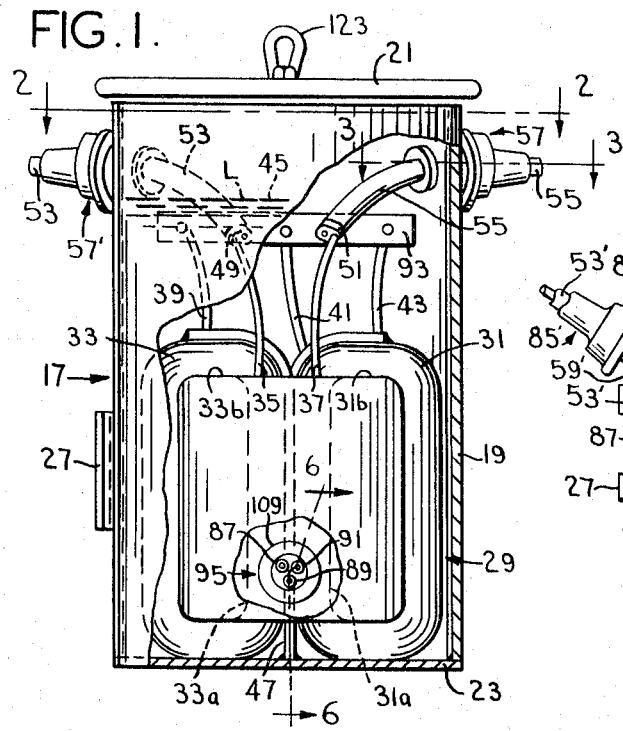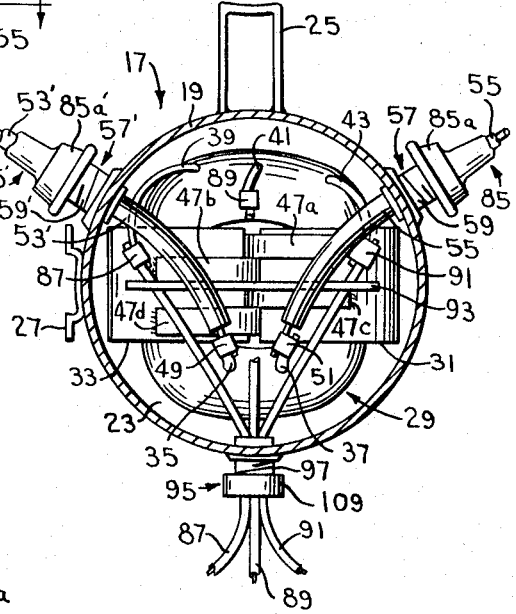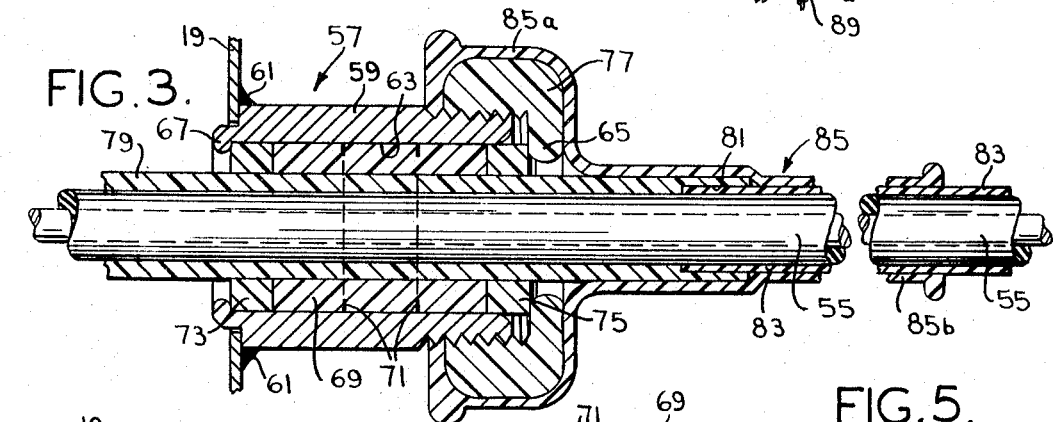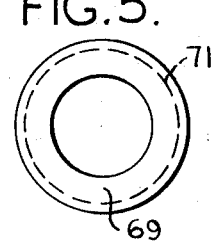

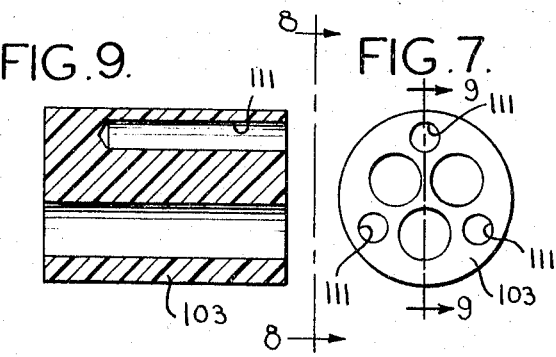
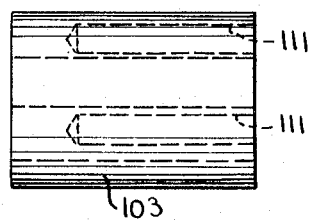
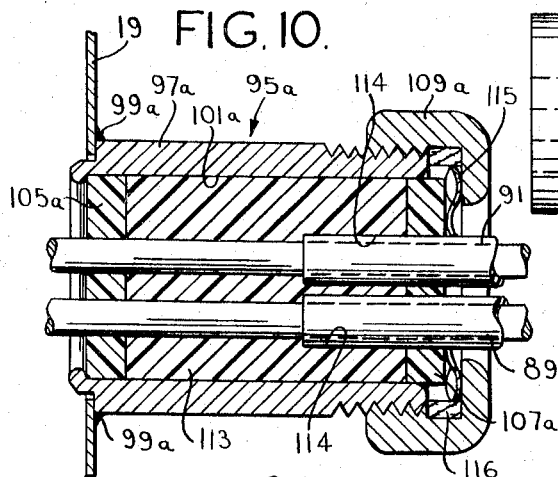
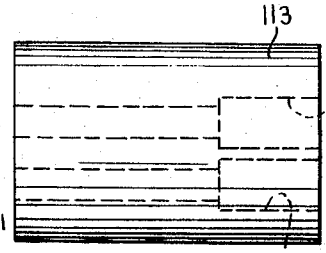
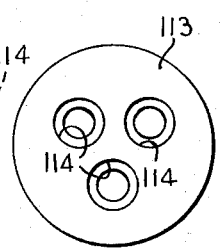
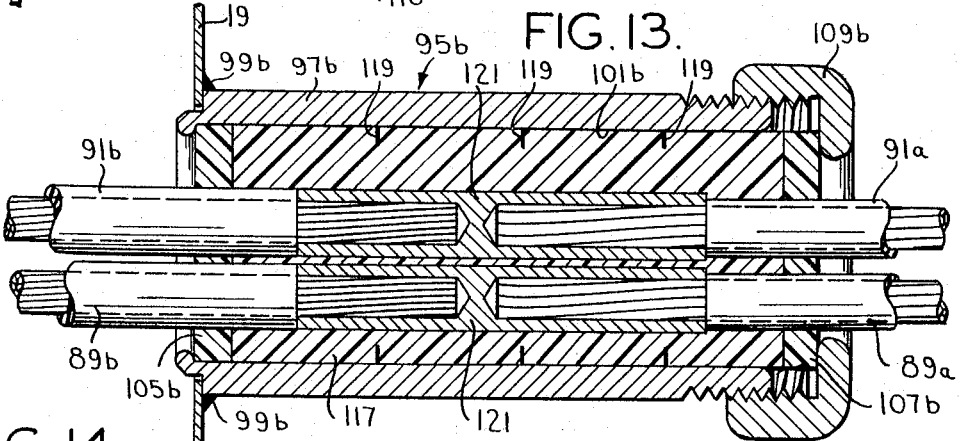
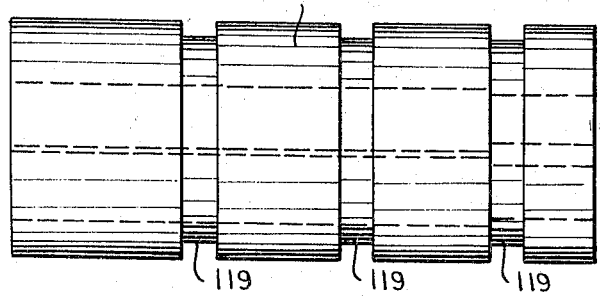
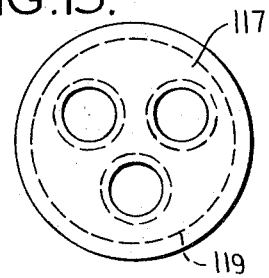

3,314,030
TRANSFORMERS WITH LEAK- AND CORONA-FREE DIRECT ELECTRICAL CONNECTIONS
Montville B. Mallett, Clayton, and William C. Reinhardt, Bellefontaine Neighbors, Mo., assignors to Central Transformer Corporation, Pine Bluff, Ark., a corporation of Arkansas
Filed Oct. 31, 1963, Ser. No. 320,411
22 Claims. (Cl. 336—58)

This invention relates to transformers, and more particularly to improved pole-type distribution transformers.

The increasing trend of electric utilities toward closer control of operating costs has necessitated a fundamentally different approach to distribution transformer design. The costs of a unit, which include both the installation costs and the expense of maintenance, are normally the controlling factors in determining whether a particular type of transformer is to be adopted by a utility. In addition to this, however, utilities continue to demand highest quality in their equipment, selecting only those transformers which exhibit superior electrical and mechanical characteristics. The present invention is directed to low-cost distribution transformers which not only provide economic advantages to utilities, but which also possess marked advantages over prior-art distribution transformers costing considerably more.

Among the several objects of this invention may be noted the provision of distribution transformers which arrest the long-standing trend of increasing manufacturing costs without adversely affecting product quality; the provision of pole-type distribution transformers which bring about a substantial reduction in the costs of installation and maintenance; the provision of pole-type distribution transformers which eliminate the expense and inconvenience of outages caused by birds and animals contacting exposed terminals; the provision of transformers of the class described which minimize the possibility of shock hazard to linemen from accidental contact with exposed transformer terminals; the provision of pole-type distribution transformers wherein primary and secondary leads may be crimped or clamped directly to a utility's cutout or cable system and which therefore eliminate at least the high voltage porcelain bushings, the tank cover complications associated with their use, and the many separate internal and external connections and jumpers necessitated by the use of such bushings; the provision of transformers of the class described in which secondary lead fittings may be located below the oil level whenever such an arrangement fits a utility's secondary line construction; the provision of pole-type distribution transformers having reduced height and weight and greatly improved appearance; and the provision of transformers which generally exhibit superior mechanical and electrical characteristics. Other objects and features will be in part apparent and in part pointed out hereinafter.

Generally the above objects are achieved by carrying an unshielded high-voltage cable or cables, and preferably also the low-voltage cables, directly into the transformer tank by means of squeeze fittings wherein these cables constitute direct and uninterrupted leads between the transformer primary and secondary windings and the primary and secondary line conductors and wherein at least high and preferably also low voltage bushings and associated fixtures are eliminated. Because of this, a gasketed cover, hand hole joints and special cover insulation may be replaced by a simple, one-piece cover which preferably is welded to the tank. Special features of the cable-squeeze fitting combination insure against oil or water seepage, corona and cable tracking. An improved and greatly simplified method of securing the core and coil unit or assembly of the transformer within the tank contributes substantially to the elimination of internal hardware, thereby providing a simple economical integral transformer unit or structure.

Essentially, then, the invention relates to a distribution transformer for interconnection to primary and secondary line conductors which includes a tank containing a dielectric fluid and a core and coil unit located within the tank below the level of the fluid. The core and coil unit includes a primary or high-voltage winding and a secondary or low-voltage winding. The tank has at least one primary squeeze fitting providing an entry into the interior of the tank. Also provided is at least one unshielded insulated primary cable connected to the primary winding and carried directly through the squeeze fitting and adapted to be directly connected to a primary line conductor exterior the tank. The primary squeeze fitting provides a corona- and track-free transition for each primary cable as it is carried through the tank wall even where the primary line potential is in the order of 12 kv. The transformer preferably further includes a secondary squeeze fitting through which is carried at least one secondary cable, one end of which is connected to the secondary winding and the other end of which is adapted to be directly connected to a secondary line conductor exterior the tank.

In one preferred embodiment of the invention, the core and coil unit includes a vertical slot which extends throughout the length thereof, and the means for securing this unit within the tank includes a tongue which has one end secured to the bottom of the tank and which projects through this slot. This tongue has an upper marginal portion which extends beyond the top of the unit and which holds the unit captive on the tongue and firmly secured against the tank bottom.

The invention accordingly comprises the constructions hereinafter described, the scope of the invention being indicated in the following claims.

In the accompanying drawings, in which one of various possible embodiments of the invention is illustrated, FIG. 1 is a side elevation, with portions broken away, of one embodiment of this invention;

FIG. 2 is a cross-sectional view, taken on line 2—2 of FIG. 1;

FIG. 3 is an enlarged cross section taken on line 3—3 of FIG. 1 illustrating details of a primary squeeze fitting;

FIG. 4 is a side elevation of a primary squeeze fitting grommet;

FIG. 5 is an end elevation of the grommet of FIG. 4;

FIG. 6 is an enlarged cross section of the secondary squeeze fitting taken on line 6—6 of FIG. 1;

FIG. 7 is an end elevation of a secondary squeeze fitting grommet;

FIG. 8 is a side elevation of the grommet of FIG. 7, viewed as indicated on line 8—8 of FIG. 7;

FIG. 8 is a cross-sectional view, taken on line 9—9 of FIG. 7;

FIG. 10 is a cross section of an alternate embodiment of a secondary squeeze fitting;

FIGS. 11 and 12 are side and end elevations, respectively, of the secondary squeeze fitting grommet of FIG. 10;

FIG. 13 is a cross section of still another type of secondary squeeze fitting; and FIGS. 14 and 15 are side and end elevations, respectively, of the secondary squeeze fitting grommet of FIG. 13 shown in an uncompressed state.

Corresponding reference characters indicate corresponding parts throughout the several views of the drawings.

Referring now to the drawings, a pole-type distribution transformer is illustrated as comprising a tank 17 having a side wall 19, a cover 21 and a bottom 23. A pair of mounting brackets for the transformer, one above the other, are indicated at 25; and a bracket for a name plate at 27. Positioned and secured within tank 17 is a core and coil unit or assembly 29. This assembly is of the shell type which includes primary or high-voltage and secondary or low-voltage windings concentrically wound about a generally vertical axis. These windings or coils pass through windows in a pair of wound cores 31 and 33 having two adjacent winding legs 31a and 33a around which the primary and secondary windings are wound and supported, and two upper yoke portions 31b and 33b. Core and coil unit 29 is conventional and accordingly will not be described in detail. The high-voltage leads for the primary winding are indicated at 35 and 37, while the secondary leads or terminals of the secondary winding are shown at 39, 41 and 43. Tank 17 is filled with a dielectric fluid 45 such as transformer oil to a level indicated at line L.

Core and winding assembly 29 is secured within tank 17 by a tongue or flat plate 47, one end of which is secured, preferably welded, to the central portion of the tank bottom 23. This tongue extends upwardly between the sides of the adjacent winding legs thereby forming its own slot or opening in assembly 29 between core winding legs 31a and 33a. The flaring section formed between the bottom portions of legs 31a and 33a forms a mouth which serves to guide unit 29 on tongue 47. The upper marginal portion of tongue 47 (which extends above the windings of the assembly) is cut or slit to form a plurality of fingers 47a, 47b, 47c and 47d, and this tongue is of such a gauge that these fingers are bendable to follow the contours or curvature of cores 31 and 33. Fingers 47a and 47c are bent over core 31 and preferably spot welded thereto, while fingers 47b and 47d are bent over core 33 and preferably spot welded thereto. This holds the core and coil assembly captive on tongue 47 against bottom 23. Moreover, this tongue electrically connects the two cores to the transformer tank.

Because fingers 47a–47d follow the contours or outlines of cores 31 and 33, they inherently tend to center assembly 29 within the tank. The provision of tongue 47 therefore not only serves as a simple means for holding the core and coil unit secured within the tank, but it also obviates the need of arrangements employed in prior-art transformers to insure that the core and coil unit is centered in the tank and that the cores are electrically connected to the tank.

Leads 35 and 37 of the primary winding are connected by respective crimp connectors 49 and 51 to a pair of insulated, unshielded primary cables or conductors 53 and 55. These cables, which preferably are of the extruded type, the insulation being of a synthetic thermoplastic resin such as polyvinyl chloride, are carried through two primary squeeze fittings or cable grip assemblies 57 and 57′ respectively to a point exterior tank 17 where they may be crimped or clamped or otherwise directly connected to the primary lines of a utility's distribution system. Fittings 57 and 57′ are preferably secured to the wall 13 of the transformer tank above the level of the fluid therein, although they may be located below the oil level if desired. Assembly 57′ is identical to assembly 57 illustrated in detail in FIG. 3, and corresponding components are indicated by primed reference numerals.

Referring now to FIG. 3, cable grip assembly 57 comprises a tubular fitting or member 59 of a conductive metal (such as "Ledloy 300" steel), which projects through a hole in tank wall 19. Fitting 59 is welded to wall 19 as indicated at 61 to form a seal around the outer periphery of this fitting. Fitting 59 comprises a tubular conductive body having an axial cylindric passage or opening 63 therein. This passage has two rounded flaring transition sections, one at its outer end indicated at 65 and the other at its inner end comprising a rounded bead 67. Primary cable 55 extends or is carried through passage 63 and through an axial opening or passage in a generally cylindrical insulating grommet 69. This grommet has an outer diameter substantially equal to the inner dimension of passage 63 and is formed of a thermosetting synthetic resin, preferably a urethane synthetic resin such as that sold under the trade designation "Solithane." A specific example of a desirable grommet material is "Solithane 291" polyurethane resin vulcanized to an elastomeric or resilient state by reacting the polymer's isocyanate groups with compounds containing active hydrogen (e.g., 100 parts by weight of this resin, 2.2 parts by weight of trimethylolpropane and 1.1 parts by weight of triisopropanolamine cured at 300° F. for one hour). Such a grommet has a hardness on the Shore A scale of approximately 55 (per ASTM D1706–61), although grommet material having hardnesses ranging from about 30 to 70 on this scale are also satisfactory. This material is relatively incompressible, has good resiliency and di-electric strength, and a compression set in the order of 7–10% (per ASTM, method B, D395–61).

Grommet 69 is externally recessed by forming annular peripheral grooves 71 in the outer surface thereof. A retainer washer 73 of hard, substantially nonresilient, insulating material, such as that sold under the trade designation "Zytel 105," is coaxially positioned within passage 63 on the inner end of the grommet. The inner face of bead 67 constitutes a shoulder means on the inner end of passage 63 against which retainer 73 bears. A second identical retainer washer 75 is also coaxially positioned within passage 63 and bears against the outer end of grommet 69. An insulating cap 77, preferably also formed of "Zytel" is threaded on the outer end of fitting 59 to force or apply pressure against the outer end of grommet 69 via the outer retainer washer 75. It will be understood that cap 77 may be formed with an inner surface contoured to register with the outer end of grommet 69, thereby obviating the use of this retainer 75.

Grommet 69 and retainers 73 and 75 are provided with an axial passage through which the primary high-voltage cable 55 is carried. This axial passage is sized to accommodate an insulating sleeve 79 having a length somewhat greater than that of the primary squeeze fitting 57. The outer end of sleeve 79 is formed with a counterbore 81 to receive the terminal portion of a polyethylene outer cable jacket 83. The bore of sleeve 79 is otherwise sized to match the outer diameter of cable 55 without this outer jacket, and the outer diameter of sleeve 79 is substantially equal to the dimensions of the axial passage through grommet 69 and the retainers 73 and 75.

Sleeve 79 is also formed of a thermosetting resin, preferably a urethane synthetic resin, such as that sold under the trade designation "Adiprene," or, if desired, "Solithane" may also be used. A specific example of a desirable sleeve material is "Adiprene L–100" polyurethane resin cured for one hour at 300° F. with 4,4′methylene bis (2-chloraniline) (12.5 parts by weight to 100 parts by weight of resin). Such a sleeve has a hardness on the Shore A scale of approximately 90, although sleeve material having a hardness ranging from about 80–110 is also satisfactory. This material is therefore considerably harder or stiffer and less resilient than that of the grommet material and, for example, has a typical compression set of approximately 25%.

Fitting 57 is provided with a cable boot 85 having an enlarged inner portion 85a surrounding and sealing the outer end portion of fitting 57 and a sleeve extension 85b of reduced diameter surrounding and sealing the portion of cable 53 immediately exterior the tank. Boot 85 is made of a resilient material which exhibits good corona and track resistance; for example, boot 85 may be made of molded silicone rubber.

In a typical installation, cables 53 and 55 will each comprise a #4 solid copper conductor (.204″ dia.) with a $\frac{5}{32}$″ thick insulation coating of extruded polyvinylchloride (e.g., such as sold under the trade designation "901 Synthinol") with an outer jacket 83 of 1/16" thick extruded polyethylene. Thus the cable insulation within the axial passage of sleeve 79 totals 5/16" in cross section as indicated in FIG. 3 and is thermoplastic. Under typical operating conditions this large volume of cable insulation will tend to soften and deform by plastic flow, thereby causing corona-generating voids, mechanical instability, and permitting leakage of the transformer oil. In accordance with the present invention these difficulties are avoided by the squeeze fitting structure which continues to sealingly grip the cable as it becomes deformed. The squeeze fittings 57 and 57' are in effect compound squeeze fittings with two squeeze elements in series. The first element is the sleeve 79 which squeezes the cable directly and is of a relatively stiff hard thermosetting material. The second element is the grommet 69 which squeezes the sleeve and is of a relatively soft or more resilient thermosetting material compared to that of the sleeve. The physical characteristics of the sleeve therefore spreads the application of the inward radial force over substantially the entire length of the cable surrounded thereby, thus avoiding large variations in inward radial pressure on the cable being gripped. As the grommet material itself is relatively incompressible, it is recessed as shown, for example, by grooves 71, the volume of these grooves being such that under extreme cable deformation it will more than equal the volume loss of the cable insulation. Thus by compressing the grommet by tightening cap 77 so the annular grooves are closed (as shown in FIG. 3), a spring action is provided exerting a substantially even inward or centripetal pressure along the entire portion of cable 55 within the fitting so as to minimize any local deformation and continue to maintain a sealing grip on the cable, thereby stabilizing the fitting assembly under varying temperature conditions and controlling the corona level and leakage.

It will be noted that, as opening or passage 63 is cylindric, dielectric stress is reduced, thereby minimizing or eliminating corona problems. For example, the formation of corona-generating voids is avoided inasmuch as any gaps or openings would occur at the outer surfaces of the grommet and away from the cable insulation surface. In one specific embodiment of the cable lead transformer of this invention wherein fitting 59 had an approximately two-inch axial length, the corona threshold was greater than 14 kv. Because of boot 85, dirt or dust cannot collect in the high stress areas of the assembly which could otherwise lower considerably the corona threshold level. Additionally, this boot serves to protect cable 53 from tracking if arcing or electrical discharge does occur. This latter feature is important since the type of unshielded cable which may be used under oil generally has poor tracking characteristics.

Leads 39, 41 and 43 of the secondary winding of assembly 29 are connected by respective crimp connectors to three insulated secondary cables 87, 89 and 91 separated and held in place by an insulating spacer 93. These cables are carried through a secondary squeeze fitting or cable grip assembly 95 (illustrated in detail in FIG. 6) which includes a metallic tubular fitting or member 97 identical to fitting 59. This member extends through a hole in tank wall 19 and is welded as indicated at 99 to the wall to form a seal around the outer periphery of member 97. Positioned within axial passage 101 of fitting 97 is a secondary squeeze fitting grommet 103 formed from the same resilient but relatively incompressible insulating material as grommet 69. Also positioned within fitting opening 101 are two hard insulating retainers or washers 105 and 107, formed from the same material as retainers 73 and 75. Grommet 103 and retainers 105 and 107 have three axial passages therein through which are carried the secondary cables 87, 89 and 91. A nut or cap 109 similar to cap 77, but which is preferably metallic, is threaded on fitting 97 to bear against retainer 107, thereby applying compressive forces on grommet 103, which is held between retainers 105 and 107, and forming a tight seal around cables 87, 89 and 91.

In a typical cable lead transformer of the present invention these secondary cables would be #4 solid copper conductor with a 5/64" thick insulating sheath of extruded polyvinylchloride thermoplastic synthetic resin. As this wall thickness of insulation is only one half that of primary cables 53 and 55, the volume of cable insulation subject to deformation and squeeze-out is much less, and accordingly relatively hard insulating sleeves such as that indicated at 79 are not employed for secondary cables of this type. However, the same compressive spring action of the resilient grommet is utilized in this secondary fitting 95 as is utilized in the primary fittings 57 and 57', described previously. Instead of providing annular peripheral grooves as in grommet 69, grommet 103 has recesses in the form of three axial bores 111 formed in the end thereof. Under the compressive forces of tightened cap 109 these recesses are closed (as indicated in FIG. 6). The volume of these recesses is at least equal to the volume loss (in the portions of thermoplastic insulation of the secondary cable portions within the axial passages of grommet 103) which may occur under extreme conditions of deformation and squeeze-out during operation of the transformer of this invention. During transformer fabrication this restorative or compressive action of the grommets is initially preset by tightening the threaded caps 109 and 77 with a torque wrench to a preselected value so that the recesses in the grommets will be sufficiently closed to provide the described action.

Another alternative embodiment of a secondary squeeze fitting 95a is illustrated in FIGS. 10–12. This fitting is substantially identical to that illustrated and described above, except that a grommet 113 of a modified design is employed. The outer end of grommet 113 is counterbored as indicated at 114 to accommodate the insulation of secondary cables 87, 89 and 91. However, the insulation is removed from each of these cables from a point within the respective grommet passages to a point within the tank. This provides a bare metallic conductor surface for gripping by the inner portion of grommet 113. Grommet 113 is not recessed peripherally or endwise (as were previously described grommets 69 and 103). To provide the stored-up compressive forces to counteract squeeze-out of the thermoplastic cable insulation, squeeze fitting 95a is provided with a spring washer 115 of the wavy or undulating type positioned between the outer surface of a hard insulating retainer washer 107a and the inner surface of threaded cap 109a. A resilient compressible insulating washer 116 of cork or a synthetic gasketing material such as that sold under the trade designation "Corprene" is located in the annular space between the inner periphery of cap 109a and the outer edge of washer 115. Spring washer 115 is substantially flattened by the action of cap 109a as it is tightened on the end of fitting 97a, thus applying a continuing compressive force on grommet 113 located between hard insulating retainers 105a and 107a. Thus, a compressive force is maintained on both the thermoplastic insulation portions of cables 87, 89 and 91 within the counterbores 114 of grommet 113 and on the bared outer metallic conductor portion surfaces in the axial grommet passages, so that a good seal is maintained by the fitting 95a to compensate for any squeeze-out or plastic deformation of the cable insulation. It will be understood that, if the volume reduction of the secondary cable insulation is anticipated to exceed that which will be compensated by the compression of a single compression washer 115, two or more of such washers may be used, preferably separated by a flat washer.

A third secondary squeeze fitting 95b is illustrated in FIGS. 13–15. This fitting is substantially identical to secondary fittings 95 and 95a, but a somewhat larger grommet 117 with peripheral grooves 119 is utilized. In this embodiment, stranded conductor secondary cables 87a, 89a and 91a are employed and each is crimp-connected end-to-end by a metallic crimping sleeve 121 to a length of insulated stranded conductor secondary cable (87b, 89b and 91b), the latter preferably employing a more finely stranded conductor for greater flexibility within the tank 17. These crimp connectors 121 present lengths of hard metallic material for gripping by the central portion of grommet 117 to seal the secondary cables within the fitting 95b.

Because each of the secondary cable grip assemblies provides an effective seal at the point at which the secondary cables are brought out of the transformer tank, this assembly may be located above or below the level of the fluid in the tank. This assembly may therefore be positioned at a point most convenient to the utility employing the transformer.

It will be understood that primary cables 53 and 55 are to be directly connected by crimping or clamping to the utility's high-voltage primary line conductor (which term includes fuse cutouts or hot clamps, etc., frequently associated with the primary conductors); while secondary cables 87, 89 and 91 may also be directly connected to the utility's secondary line conductors. This eliminates intermediate jumpers and connectors such as currently employed. And since there are no exposed line parts on the transformer, risk of outages caused by birds and animals is positively eliminated. Moreover, this feature minimizes the possibility of shock to linemen from accidental contact with exposed transformer terminals.

Since the metal cover 21 which forms the top of tank 17 has no high or low voltage bushings and associated taps or fixtures, a gasketed cover having special handhole joints and special insulation is not required and accordingly the cover is a simple, inexpensive, one-piece cover which is preferably welded to side walls 19. A lifting eye for the transformer is attached to the center of cover 21 and indicated at 123.

In view of the foregoing it is seen that this invention provides distribution transformers, particularly such as are usually pole-hung, which are inherently different from and considerably less expensive than transformers of this type now being employed. Moreover, these transformers possess substantial advantages over prior-art transformers: They have a reduced height and weight, and a less cluttered and therefore more pleasing appearance. They may be interconnected in a distribution system without the need of intermediate jumpers or connectors. The secondary conductors or cables may be brought out of the tank at a point which best serves a utility's convenience. And finally, the transformer of this invention is considerably safer and less likely to be the cause of outages than units employing exposed taps and bushings.

At present, the range of application for the transformer of this invention is 5 through 25 kva., 2.4 through 12 kv. primary, 120/240 v. three-wire secondary. Tests have indicated, however, the feasibility of considerably extending the range of application of this transformer. It will be noted that a principal feature and advantage of the present invention, i.e., the elimination of high-voltage bushings, may be retained and other substantial benefits derived from this invention even if the low-voltage fittings such as 95, 95a and 95b are not employed, but conventional bushings are used for the low-voltage or secondary cables.

It will be understood that if the transformers of this invention are to be employed in distribution systems wherein only one primary lead is required (i.e., in systems wherein one side of the primary winding is connected internally to the tank which is grounded) only one primary squeeze fitting will be required. Also, it will be understood that in some applications it will be desirable to carry the primary or secondary cables through the top of tank 17, i.e. through cover 21, in which case the appropriate squeeze fittings would extend through this cover. Further, it will be noted that elastomeric materials other than urethanes (e.g., fluorohydrocarbon materials such as that sold under the trade designation "Viton" and other synthetic rubber or elastomeric materials such as neoprene and buna-N, which are compatible with the dielectric fluid under the temperature ranges of transformer operation) may be utilized in the fabrication of the grommets and sleeves of these primary and secondary fittings.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A distribution transformer for interconnection to a primary line conductor comprising a tank containing a dielectric fluid, a core and coil unit located within said tank below the level of said fluid, said unit including a primary winding and a secondary winding, means for securing said unit within said tank, said tank having at least one primary squeeze fitting providing an entry into the tank interior, at least one insulated primary cable connected to said primary winding and carried directly through said squeeze fitting and adapted to be directly connected to the primary line conductor exterior said tank, said squeeze fitting comprising a tubular conductive member extending through the tank wall and having a cylindric passage therethrough, a resilient generally cylindrical insulating grommet positioned within said fitting and having an outer diameter substantially equal to the inner dimension of said passage, an insulating substantially nonresilient retainer coaxially positioned within said passage on the inner end of said grommet, said cable insulation being formed of a thermoplastic synthetic resin and the grommet being formed of substantially incompressible thermosetting synthetic resin, said grommet and retainer having axial passages through which said primary cable is carried, shoulder means on the inner end of said cylindric passage against which said retainer bears, and means including a cap threadable on the outer end of said fitting for maintaining endwise compression on said grommet, said grommet being provided with recesses which are substantially closed under compression by said cap whereby upon any deformation of the primary cable insulation the grommet expands correspondingly and deforms radially inwardly to maintain a seal around said cable thereby effectively sealing the interior of said tank whereby leak- and corona-free direct electrical connections may be made and maintained between the primary winding and the primary line conductor.

2. A distribution transformer as set forth in claim 1 wherein the grommet is formed of a urethane synthetic resin having a hardness of between approximately 30 and 70 on the Shore A scale.

3. A distribution transformer for interconnection to a primary line conductor comprising a tank containing a dielectric fluid, a core and coil unit located within said tank below the level of said fluid, said unit including a primary winding and a secondary winding, means for securing said unit within said tank, said tank having at least one primary squeeze fitting providing an entry into the tank interior, at least one insulated primary cable connected to said primary winding and carried directly through said squeeze fitting and adapted to be directly connected to the primary line conductor exterior said tank, said squeeze fitting comprising a tubular conductive member extending through the tank wall and having a cylindric passage therethrough, a resilient generally cylindrical insulating grommet positioned within said fitting and having an outer diameter substantially equal to the inner dimension of said passage, an insulating substantially nonresilient retainer coaxially positioned within said passage on the inner end of said grommet, said grommet and retainer having axial passages through which said primary cable is carried, an insulating sleeve positioned within the axial passage of the primary squeeze fitting grommet and surrounding the portion of the primary cable passing through this fitting, said sleeve having a hardness substantially greater than that of said grommet, shoulder means on the inner end of said cylindric passage against which said retainer bears, and means including a cap threadable on the outer end of said fitting for maintaining endwise compression on said grommet, said grommet being adapted upon any deformation of the primary cable insulation to deform radially inwardly to maintain seals between said grommet and said sleeve and said cable thereby effectively sealing the interior of said tank whereby leak- and corona-free direct electrical connections may be made and maintained between the primary winding and the primary line conductor.

4. A distribution transformer as set forth in claim 3 in which the grommet is formed of a urethane synthetic resin having a hardness of approximately 55 on the Shore A scale, and said sleeve is a urethane synthetic resin having a hardness on the Shore A scale of approximately 90.

5. A distribution transformer as set forth in claim 3 wherein said grommet is provided with exterior recesses which are substantially closed under said compression by said cap whereby upon any softening or deformation of the thermoplastic primary cable insulation the grommet expands correspondingly to maintain the seal between the fitting and the primary cable thus avoiding the formation of corona-generating voids.

6. A distribution transformer as set forth in claim 5 wherein said recesses comprise annular grooves formed in the outer surface of said grommet.

7. A distribution transformer as set forth in claim 5 wherein said recesses are formed in an end of said grommet.

8. A distribution transformer as set forth in claim 5 which further includes a boot of resilient insulating material having an enlarged inner portion surrounding and sealing the outer end portion of said primary squeeze fitting and an extension of reduced diameter surrounding and sealing the portion of the primary cable entering the squeeze fitting immediately exterior the tank whereby tracking of said primary cable is inhibited.

9. A distribution transformer for interconnection to primary and secondary line conductors comprising a tank containing a dielectric fluid, a core and coil unit located within said tank below the level of said fluid, said unit including a primary winding and a secondary winding, means for securing said unit within said tank, said tank having at least one primary squeeze fitting providing an entry into the tank interior, at least one unshielded insulated primary cable connected to said primary winding and carried directly through said squeeze fitting and adapted to be directly connected to a primary line conductor exterior said tank, a secondary squeeze fitting providing another entry into the tank interior, at least one insulated secondary cable connected to said secondary winding and carried through said secondary squeeze fitting and adapted to be directly connected to a secondary line conductor exterior said tank, each of said squeeze fittings comprising a tubular conductive member extending through the tank wall and having a cylindric passage therethrough, a resilient generally cylindrical insulating grommet positioned within each of said fittings and having an outer diameter substantially equal to the inner dimension of said passage, an insulating substantially nonresilient retainer coaxially positioned within said passage on the inner end of each of said grommets, the insulation of said primary cable being formed of a thermoplastic synthetic resin and the grommets being formed of a substantially incompressible thermosetting synthetic resin, said grommets and retainers having axial passages through which said respective primary and secondary cables are carried, shoulder means on the inner end of each of said cylindric passages against which said retainer bears, and means including a cap threadable on the outer end of each of said fittings for maintaining endwise compression on said grommet, said primary fitting grommet being provided with recesses which are substantially closed under compression by said cap whereby upon any deformation of the primary cable insulation of grommet expands correspondingly and deforms radially inwardly to maintain a seal around said cable thereby effectively sealing the interior of said tank whereby leak- and corona-free direct electrical connections may be made and maintained between the primary and secondary windings and primary and secondary line conductors.

10. A distribution transformer as set forth in claim 9 wherein the grommets are formed of a urethane synthetic resin having a hardness of between approximately 30 and 70 on the Shore A scale.

11. A distribution transformer for interconnection to primary and secondary line conductors comprising a tank containing a dielectric fluid, a core and coil unit located within said tank below the level of said fluid, said unit including a primary winding and a secondary winding, means for securing said unit within said tank, said tank having at least one primary squeeze fitting providing an entry into the tank interior, at least one unshielded insulated primary cable connected to said primary winding and carried directly through said squeeze fitting and adapted to be directly connected to a primary line conductor exterior said tank, a secondary squeeze fitting providing another entry into the tank interior, at least one insulated secondary cable connected to said secondary winding and carried through said secondary squeeze fitting and adapted to be directly connected to a secondary line conductor exterior said tank, each of said squeeze fittings comprising a tubular conductive member extending through the tank wall and having a cylindric passage therethrough, a resilient generally cylindrical insulating grommet positioned within each of said fittings and having an outer diameter substantially equal to the inner dimension of said passage, an insulating substantially nonresilient retainer coaxially positioned within said passage on the inner end of each of said grommets, said grommets and retainers having axial passages through which said respective primary and secondary cables are carried, an insulating sleeve positioned within the axial passage of the primary squeeze fitting grommet and surrounding the portion of the primary cable passing through this fitting, said sleeve having a hardness substantially greater than that of said grommets, shoulder means on the inner end of each of said cylindric passages against which said retainer bears, and means including a cap threadable on the outer end of each of said fittings for maintaining endwise compression on said grommet, said primary squeeze fitting grommet being adapted upon any deformation of the primary cable insulation to deform radially inwardly to maintain a seal between said grommet and said sleeve and said primary cable thereby effectively sealing the interior of said tank whereby leak- and corona-free direct electrical connections may be made and maintained between the primary and secondary windings and primary and secondary line conductors.

12. A distribution transformer as set forth in claim 11 in which the grommets are formed of a urethane synthetic resin having a hardness of approximately 55 on the Shore A scale, and said sleeve is a urethane synthetic resin having a hardness on the Shore A scale of approximately 90.

13. A distribution transformer as set forth in claim 11 wherein the compression maintaining means for the secondary squeeze fitting includes a compressible spring washer adapted to apply endwise compressive forces on the grommet upon tightening of the threadable cap on said fitting.

14. A distribution transformer as set forth in claim 11 wherein at least each said primary squeeze fitting grommet is provided with exterior recesses which are substantially closed under said compression by said insulating cap whereby upon any softening or deformation of the thermoplastic primary cable insulation the grommet expands correspondingly to maintain the seal between the fitting and the primary cable thus avoiding the formation of corona-generating voids.

15. A distribution transformer as set forth in claim 14 wherein said recesses comprise annular grooves formed in the outer surface of said grommets.

16. A distribution transformer as set forth in claim 14 which further includes a boot of resilient insulating material having an enlarged inner portion surrounding and sealing the outer end portion of said primary squeeze fitting and an extension of reduced diameter surrounding and sealing the portion of the primary cable entering the squeeze fitting immediately exterior the tank whereby tracking of said primary cable is inhibited.

17. A distribution transformer as set forth in claim 14 in which the secondary squeeze fitting is positioned in the tank wall below the level of said fluid and the primary fitting is positioned in the tank wall above the level of the fluid.

18. A distribution transformer as set forth in claim 14 in which the core and coil unit is of the shell type comprising two wound cores having two adjacent winding legs around which the primary and secondary windings are wound and two upper yoke portions, and wherein said means for securing said unit within said tank includes a tongue secured at its one end to the bottom of the tank and extending upwardly between the adjacent core winding legs to an upper marginal portion which is secured against the upper core yokes.

19. A distribution transformer as set forth in claim 14 in which the primary and secondary tubular conductive members are substantially identical.

20. A distribution transformer as set forth in claim 14 in which there are three secondary cables and the secondary squeeze fitting grommet and retainer have three parallel axial passages therethrough.

21. A distribution transformer as set forth in claim 20 in which each of the secondary cables comprises two insulated stranded conductor lengths crimp-connected together end-to-end by a metallic crimping sleeve, and each of the sleeves has a length substantially less than that of said secondary grommet and is generally centrally positioned in a respective one of said axial grommet passages whereby the inner secondary grommet surfaces sealingly grip both the secondary cable insulation and the surfaces of the crimp connectors.

22. A distribution transformer as set forth in claim 20 in which each of the portions of the secondary cables from a point within the respective secondary grommet passage to a point within the tank is uninsulated, and each of the secondary grommets is counterbored at the outer end to accept the insulated portion of the secondary cables whereby the inner secondary grommet surfaces sealingly grip both the secondary cable insulation and the bare uninsulated secondary cable portions within said secondary grommet.

References Cited by the Examiner

UNITED STATES PATENTS

| | | | |
|---|---|---|---|
| 1,677,681 | 7/1928 | Montsinger | 336—58 |
| 2,076,261 | 4/1937 | Bauroth | 174—65 |
| 3,055,972 | 9/1962 | Peterson | 174—65 X |

LEWIS H. MYERS, *Primary Examiner.*

LARAMIE E. ASKIN, T. J. KOZMA,
*Assistant Examiners.*